(12) United States Patent
Brouwer et al.

(10) Patent No.: US 7,762,180 B2
(45) Date of Patent: *Jul. 27, 2010

(54) APPARATUS AND METHOD FOR PREPARING COFFEE WITH A FINE-BUBBLE FROTH LAYER, IN PARTICULAR CAPPUCCINO

(75) Inventors: Gustaaf Frans Brouwer, Nijkerk (NL); Diederik Kraan, Apeldoorn (NL)

(73) Assignee: Sara Lee/DE N.V., Utrecht (NL)

( * ) Notice: Subject to any disclaimer, the term of this patent is extended or adjusted under 35 U.S.C. 154(b) by 1452 days.

This patent is subject to a terminal disclaimer.

(21) Appl. No.: 11/011,647

(22) Filed: Dec. 13, 2004

(65) Prior Publication Data

US 2005/0155494 A1 Jul. 21, 2005

(30) Foreign Application Priority Data

Jun. 12, 2002 (NL) .................................... 1020837

(51) Int. Cl.
*A47J 31/00* (2006.01)
(52) U.S. Cl. .......................................... 99/295; 99/299
(58) Field of Classification Search ........... 99/275–323, 99/495, 516, 485, 452–455
See application file for complete search history.

(56) References Cited

U.S. PATENT DOCUMENTS

| | | | |
|---|---|---|---|
| 3,433,464 A | 3/1969 | Swafford et al. | |
| 4,694,740 A | 9/1987 | Daloz et al. | |
| 5,150,645 A | 9/1992 | Schiettecatte | |
| 5,265,519 A | 11/1993 | Schiettecatte et al. | |
| 5,638,740 A * | 6/1997 | Cai | 99/295 |
| 6,012,379 A * | 1/2000 | Matuschek | 99/323 |
| 6,016,740 A * | 1/2000 | Hilbrich | 99/298 |

(Continued)

FOREIGN PATENT DOCUMENTS

DE 40 37 366 A1 5/1992

(Continued)

OTHER PUBLICATIONS

International Search Report.

*Primary Examiner*—Timothy F. Simone
(74) *Attorney, Agent, or Firm*—Foley & Lardner LLP

(57) ABSTRACT

An apparatus for preparing a beverage fit for consumption with a fine-bubble froth layer, in particular cappuccino. The invention provides a beverage unit, which dispenses under pressure a beverage to be processed to a beverage processing path, through which, in use, the beverage flows to obtain the beverage with the fine-bubble froth layer. The beverage processing path successively includes a nozzle and a buffer reservoir, the nozzle being positioned relative to the buffer reservoir such that, in use, it generates a liquid jet squirting into the buffer reservoir to obtain the beverage with the fine-bubble froth layer. The buffer reservoir is provided with an outlet path for discharging the beverage from the buffer reservoir, the liquid flow path, upstream of the nozzle, further including an additive holder which, in use, can be filled with a product to be dissolved in the beverage, such as concentrated milk or milk powder. In use, beverage leaving the beverage unit flows into the additive holder to dissolve the possible additive in the beverage. The additive holder is provided with an outlet path, via which the beverage is further transported from the additive holder to generate the jet of the beverage.

16 Claims, 2 Drawing Sheets

U.S. PATENT DOCUMENTS

| | | | |
|---|---|---|---|
| 6,220,147 B1 * | 4/2001 | Priley | 99/323 |
| 6,412,394 B2 * | 7/2002 | Bonanno | 99/299 |
| 6,488,976 B1 * | 12/2002 | Priley | 426/435 |
| 6,499,689 B1 | 12/2002 | Miyazaki | |
| 6,722,265 B2 * | 4/2004 | Priley | 99/299 |
| 6,740,345 B2 * | 5/2004 | Cai | 426/77 |
| 6,769,352 B2 | 8/2004 | de Bruin et al. | |
| 6,840,158 B2 * | 1/2005 | Cai | 99/323.1 |
| 7,032,504 B2 * | 4/2006 | Lee | 99/287 |
| 7,228,790 B2 * | 6/2007 | Chen et al. | 99/302 R |
| 7,279,188 B2 * | 10/2007 | Arrick et al. | 426/115 |
| 2004/0241307 A1 | 12/2004 | Knitel | |

FOREIGN PATENT DOCUMENTS

| | | |
|---|---|---|
| DE | 42 13 895 A1 | 11/1992 |
| DE | 44 24 835 A1 | 1/1996 |
| EP | 0 878 158 | 11/1998 |
| EP | 0904717 | 3/1999 |
| GB | 989996 | 4/1965 |
| JP | 11-120434 | 4/1999 |
| NL | 7215523 | 5/1974 |
| NL | 1013270 | 4/2001 |
| WO | WO 89/12416 A2 | 12/1989 |
| WO | WO 2004/056246 A1 | 7/2004 |

* cited by examiner

APPARATUS AND METHOD FOR PREPARING COFFEE WITH A FINE-BUBBLE FROTH LAYER, IN PARTICULAR CAPPUCCINO

CROSS-REFERENCE TO RELATED APPLICATIONS

The present application is a continuation of PCT/NL03/000425, which claims priority from Netherlands Patent Application No. 1020837, filed Jun. 12, 2002.

BACKGROUND

The invention relates to an apparatus for preparing a beverage fit for consumption with a fine-bubble froth layer, in particular cappuccino, provided with a beverage unit, which dispenses under pressure a beverage to be processed to a beverage processing path, through which, in use, the beverage flows to obtain the beverage with the fine-bubble froth layer, the beverage processing path successively including a nozzle and a buffer reservoir, the nozzle being positioned relative to the buffer reservoir such that, in use, it generates a jet of the beverage, which squirts into the buffer reservoir to obtain the beverage with the fine-bubble froth layer, and the buffer reservoir being provided with an outlet path for discharging the beverage with the fine-bubble froth layer from the buffer reservoir.

The invention also relates to a method for preparing a beverage fit for consumption with a fine-bubble froth layer, in particular cappuccino, a jet of a beverage to be processed being generated, which is squirted into a buffer reservoir to obtain the beverage with the fine-bubble froth layer.

Such an apparatus and method are known from European patent application 0 878 158.

It is found that such an apparatus is very satisfactory for preparing coffee with a fine-bubble froth layer (also called café crème). This fine-bubble froth layer comprises coffee bubbles filled with air.

Although the respective apparatus is very satisfactory, the invention contemplates improving the apparatus in the sense that, if desired, also at least one additive can be added to the beverage, such as, for instance, concentrated milk or milk powder for preparing, for instance, cappuccino.

SUMMARY

To this end, the apparatus according to invention is characterized in that the liquid flow path, upstream of the nozzle, further includes an additive holder, which, in use, can be filled with a product to be dissolved in the beverage, such as concentrated milk or milk powder, beverage leaving the beverage unit, in use, flowing into the additive holder to dissolve the possible additive in the beverage, the additive holder being provided with an outlet path, via which the beverage is further transported from the additive holder to the nozzle to generate the jet of the beverage, the buffer reservoir being in fluid communication with surroundings of the apparatus only via the outlet path and the nozzle.

In use, the beverage leaving the beverage unit will flow into the additive holder. From the additive holder, the beverage will be further transported via the outlet path of the additive holder to the nozzle to generate the jet of the beverage. The buffer reservoir will then be gradually filled with the beverage by the jet of the beverage. The jet will then start squirting into the liquid level which has meanwhile formed in the buffer reservoir to obtain the fine-bubble froth layer. Besides, at any moment, the buffer reservoir will start emptying via the outlet path to discharge the beverage with the fine-bubble froth layer.

When a beverage with an additive, such as cappuccino, is to be formed by means of the apparatus, the respective additive, such as milk, concentrated milk or powdered milk, is included in the additive holder. The beverage leaving the beverage unit flows into the additive holder so that the additive dissolves in the beverage. Subsequently, the beverage with the additive dissolved therein will be further transported via the outlet path of the additive holder to the nozzle to generate the jet of the beverage. By means of the jet of the beverage, the buffer reservoir will gradually be filled with the beverage. The jet will then start squirting into the liquid level, which has meanwhile formed in the buffer reservoir to obtain the fine-bubble froth layer. In case the beverage consists of coffee and the additive of concentrated milk, cappuccino is formed in the buffer reservoir. The thus formed beverage with the fine-bubble froth layer will be discharged from the buffer reservoir via the outlet path of the buffer reservoir and is now ready for consumption.

In particular, it holds that the apparatus is further provided with a siphon for feeding the beverage from the additive holder to the nozzle when the level of the beverage in the additive holder exceeds a predetermined value.

In this manner, the additive possibly brought into the additive holder will not leave the additive holder before the beverage in which the additive is to be dissolved, is fed to the additive holder. The additive holder may then previously be filled with the additive to a predetermined value. The feed of the beverage to the additive holder ensures that the level of the beverage and the additive, as far as dissolved in the beverage, exceeds the predetermined value, which has the result that the additive holder will start emptying via the siphon. In particular, it holds that the siphon is provided with a part of the liquid flow path surrounded by channel walls, with an inflow opening located in the additive holder above a bottom of the additive holder and an outflow opening located outside the additive holder. Due to the siphon, the additive holder can empty to the liquid level, which has fallen to the inflow opening. This inflow opening is therefore preferably located as close to the bottom of the additive holder as possible.

In particular, it further holds that the outflow opening is located lower than a lowest part of the bottom. In this manner, it is ensured that the inflow opening can be placed at least practically against the bottom without possible loss of the action of the siphon.

Preferably, it holds that the beverage processing path, upstream of the additive holder, further includes a pad holder, which is arranged to include a pad, which comprises a product to be extracted or to be dissolved, such as ground coffee, through which pad in the holder, in use, a liquid flows, which is fed under pressure to the holder to obtain the beverage to be further processed, which is fed to the additive holder, at least part of the liquid flow path extending from the pad holder to the nozzle being of closed design so that pressure of the liquid fed to the pad holder is also present with the beverage fed to the nozzle to obtain the jet from the nozzle squirting into the buffer reservoir. Such an apparatus is particularly suitable for preparing fresh coffee. In that case, the pad can be filled with ground coffee.

Preferably, it holds that the outer channel is detachably connected with the inner channel. Preferably, it further holds that the pad holder and the additive holder are detachably connected with each other. When the pad holder is uncoupled from the additive holder, the outer channel is thus also removed around the inner channel so that both channels can be cleaned, if desired. Besides, the additive holder can then be filled with a possible additive, and the pad holder can be filled with a pad.

When using an apparatus with the above pad holder, it further preferably holds that the beverage unit is further provided with a hot water unit for feeding, under pressure, the liquid in the form of hot water to the pad holder.

In general, it preferably holds that the additive holder is provided with an outlet opening for the liquid, the outflow opening of the additive holder being in fluid communication with a nozzle and/or forming the nozzle.

BRIEF DESCRIPTION OF THE DRAWINGS

The method according to the invention is characterized in that an additive holder is further used, which can include an additive to be dissolved in the beverage, such as concentrated milk, the beverage to be processed being fed to the additive holder, after which the beverage is further transported from the additive holder to generate the jet of the beverage.

The invention will now be explained in more detail with reference to the drawing.

In this drawing:

FIG. 1 shows a possible embodiment of an apparatus according to the invention;

FIG. 2a shows a pad holder of the apparatus according to FIG. 1;

FIG. 2b shows an additive holder of the apparatus according to FIG. 1; and

FIG. 2c shows a buffer reservoir of the apparatus according to FIG. 1.

DETAILED DESCRIPTION OF EXEMPLARY EMBODIMENTS

Figure 1:
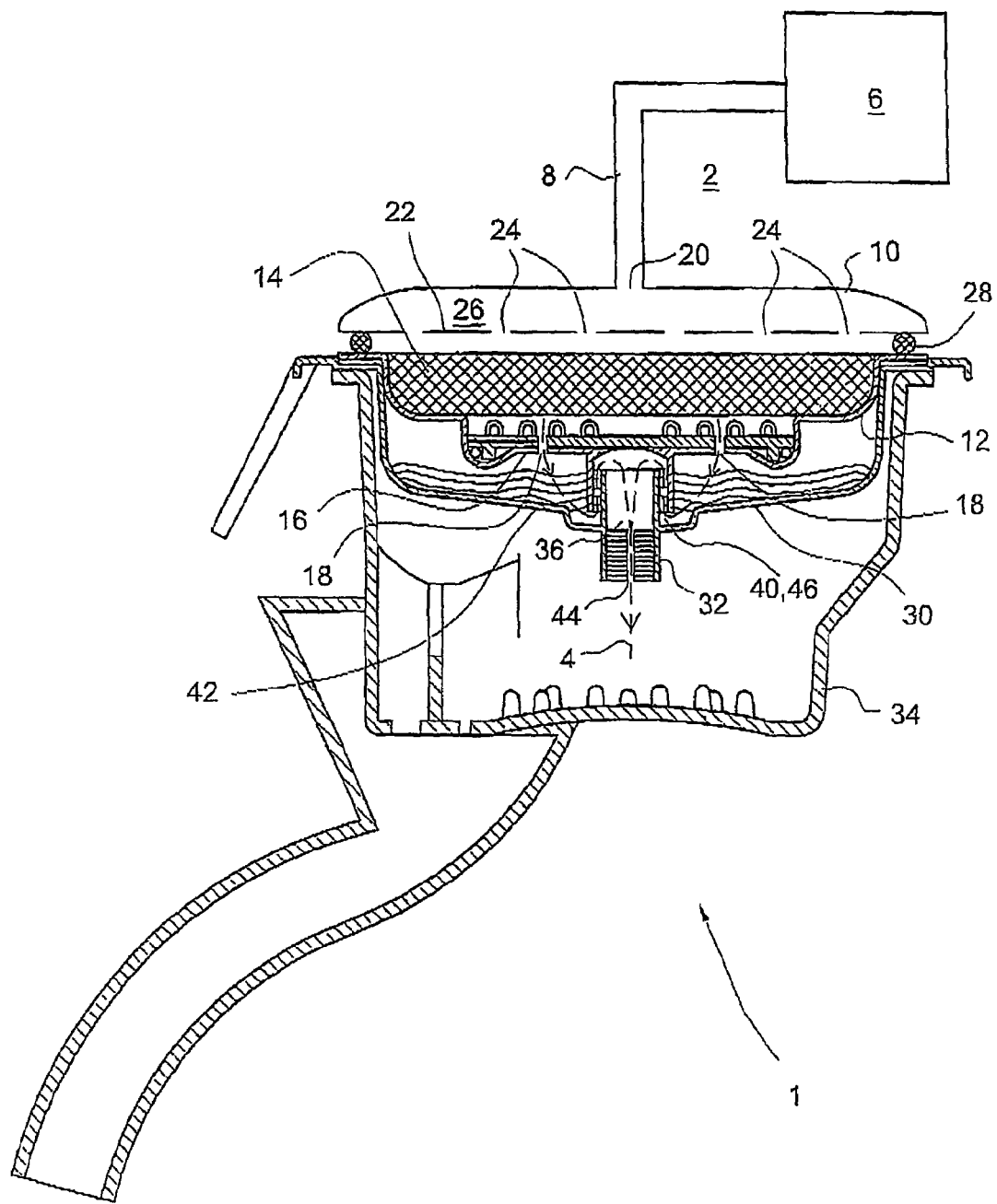

In FIG. 1, an apparatus for preparing a beverage fit for consumption with a fine-bubble froth layer is indicated by reference numeral 1.

This example deals with an apparatus for preparing coffee with a fine-bubble froth layer, in particular cappuccino. The apparatus is provided with a beverage unit 2, which, in use, dispenses under pressure a beverage to be further processed by the apparatus to a beverage processing path 4, which is schematically indicated in the drawing by a dotted line.

In this example, the beverage unit 2 is provided with a hot water unit 6, which is in fluid communication via a line 8 with a cover 10 for feeding hot water to a pad holder 12 of the apparatus. The pad holder can, in use, be filled with, for instance, a coffee pad 14. Arranged in a bottom 16 of the pad holder are a number of outflow openings 18, which, for instance, lie on a circle around the middle of the pad holder, which is circular in this example. The hot water is fed from the hot water unit 6 by means of the conduit 8 to a feed opening 20 of the hollow cover. The hollow cover is provided on its lower side with a plate 22, which is provided with a number of outflow openings 24. In use, the hot water flows under pressure from the hot water unit via the conduit 8 to an inner space 26 of the cover to subsequently leave the cover by means of the outflow openings. The hot water is thus fed to an upper side of the holder 12. The hot water is then pressed through the pad, after which coffee extract is formed. Under pressure generated by the beverage unit 6, this coffee extract is pressed out of the pad holder via the outflow openings 16. By means of a seal ring 28, the cover is connected to the pad holder 12 in a fluid-tight manner. A beverage to be further processed by the apparatus is thus dispensed under pressure through the outflow opening 24 of the beverage unit 2.

The apparatus 1 is further provided with an additive holder 30 included in the beverage processing path 4, which additive holder, in use, can be filled with a product dissolved in the beverage, such as concentrated milk or milk powder. Furthermore, the beverage processing path includes a nozzle 32 and a buffer reservoir 34. The nozzle is positioned relative to the buffer reservoir such that, in use, it generates a liquid jet, which squirts into the buffer reservoir.

The apparatus is further provided with an outlet path 36, via which the beverage is further transported from the additive holder 30 to the nozzle 32 to generate the jet of the beverage.

The outlet path 36 is provided with a siphon for feeding the beverage from the additive holder to the nozzle when the level of the beverage in the additive holder exceeds a predetermined value. The siphon is provided with a liquid flow path surrounded by channel walls, with an inflow opening 40 located in the additive holder above a bottom 42 of the additive holder and an outflow opening 44 located outside the additive holder. In this example, the outflow opening is located lower than the inflow opening. The siphon is further provided with a highest point 46, which is higher than the inflow opening 40. The highest point 46 of the siphon is understood herein to mean the minimum height over which a liquid molecule must at least rise to be able to flow through the siphon. In this example, the bottom 42 is of concave design and forms a funnel bottom. In this example, the inflow opening 40 is located near a lowest point of the bottom. It further holds that the nozzle 32, in this example, forms the outflow opening 44 of the siphon.

Figure 2A:
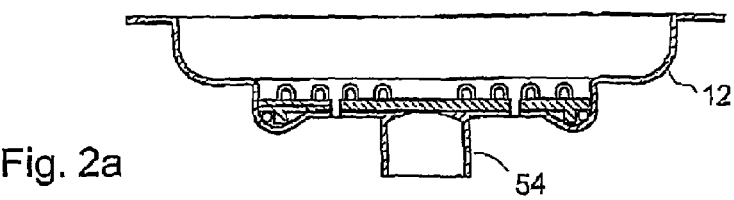
Figure 2B:
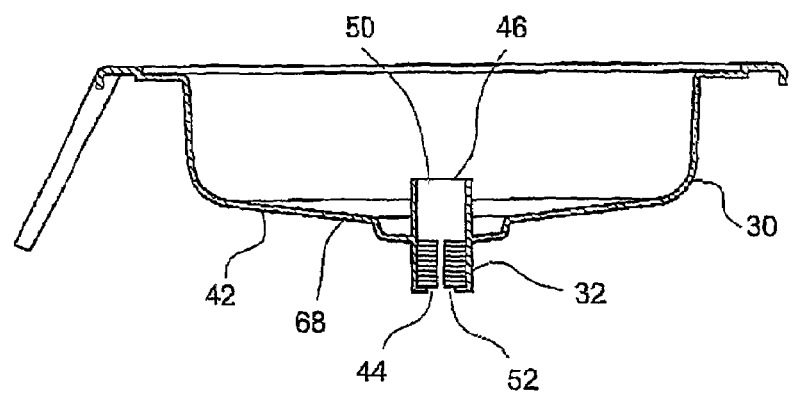
Figure 2C:
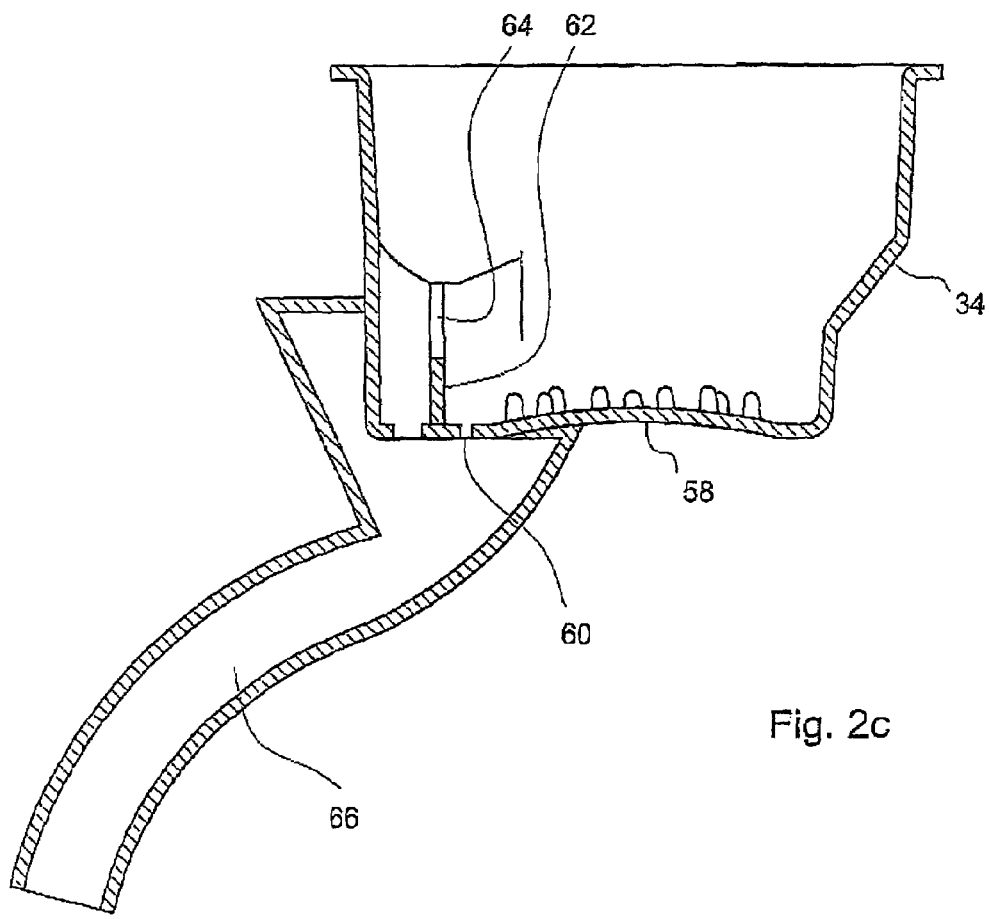

In this example, it further holds (see FIGS. 2a, 2b) that the liquid flow path in the siphon is formed by an inner channel 48, which extends through the bottom 42 of the additive holder 30. The inner channel 48 is provided with a first open end 50, which is at a higher level than the inflow opening 44. Furthermore, in this example, the open end 50 is located within the additive holder 30. The inner channel is further provided with a second open end 52, which is located outside the additive holder 30 and preferably below the bottom 42. The second open end 52 corresponds with the above-mentioned outflow opening 36 and, in this example, also with the nozzle 32. The siphon is further provided with an outer channel 54, which surrounds the inner channel 48. The outer channel 54 extends to above the first open end 50 of the inner channel 48 and, above the first open end, is of closed design. Below the first open end 50, the outer channel is provided with an opening 56, which forms the inflow opening 40 of the liquid flow path through the siphon. In this example, the inflow opening 56 is formed by an open end of the outer channel 54. This open end is not closed completely by the bottom 42 of the additive holder. The outer channel 54 is detachably connected with the additive holder 30. It can therefore be removed, as shown in FIGS. 2a and 2b. In fact, it further holds that the outer channel is detachably connected with the inner channel. In this example, the outer channel is firmly connected with the pad holder. In this example, the inner channel is firmly connected with the additive holder 30.

In this example, the buffer reservoir 34 is provided with a bottom 58, which is of slightly convex design. An outlet path of the buffer reservoir comprises at least one outflow opening 60, which is arranged in the bottom 58. Furthermore, it comprises an overflow 64 arranged in a side wall 62 of the buffer reservoir. The outflow opening 60 and the overflow 64 each discharge into a beverage dispensing channel 66. The buffer reservoir can be designed as described in the international patent application PCT/NL01/00655.

If, as shown in FIG. 1, the pad holder 12 is positioned on the additive holder 30, it holds that the inner space of the additive holder is sealed in a liquid-tight manner. This involves that the beverage processing path from the beverage unit up to and including the nozzle is of closed design for feeding the beverage under pressure to the nozzle.

The hitherto described apparatus operates as follows. To prepare cappuccino, the cover 10 is taken from the pad holder, as shown in FIG. 2a. A coffee pad can then be positioned in the pad holder. Also, the pad holder is lifted from the additive holder. In this example, the additive holder is filled with concentrated milk 68 (see FIG. 2b). This concentrated milk remains present in the additive holder as long as the liquid level is lower than the highest point 46 of the siphon. Subsequently, the additive holder 30 is positioned on the buffer reservoir 34. Also, the pad holder with the coffee pad 12 therein is placed on the additive holder 30. After this, the pad holder is closed by the cover 10. The cover 10 then clamps on the pad holder in downward direction. This also results in a liquid seal between the pad holder and the additive holder 30. The inner space of the additive holder 30 is thus also sealed in an airtight manner. Also, the inner space of the pad holder is closed by the cover.

When the beverage unit 6 is then started with feeding hot water under pressure to the feed opening 20 of the cover 10, this hot water will leave the cover 10 via the outflow opening 24 and is thus fed to the upper side of the pad holder 12. The hot water is pressed through the pad, after which a beverage to be further processed is formed in the form of coffee extract. The beverage leaves the coffee holder via the outflow openings 18, which are arranged in the bottom of the pad holder 12. The pressure in the additive holder can thus rise when the liquid level is located above the inflow opening, so that a bit of milk possibly flows away via the siphon. The beverage with possible gases released during the preparation of the coffee extract thus arrives in the additive holder 30. In the additive holder 30, the beverage and the additive will start mixing. Because the liquid level in the additive holder rises, this will also happen in the siphon. Because the pressure in the additive holder rises when the inflow opening 40 is located below the liquid surface in the additive holder, the level of the liquid in the siphon will possibly become higher than in the additive holder. When in the siphon the liquid level rises to above the highest point 46 in the siphon, the liquid will start flowing out of the additive holder 30 via the siphon and the outflow opening 44, which is equal to the nozzle in this example. By means of the nozzle, a jet of the beverage is generated in connection with the pressure generated by the water unit 6. This beverage now comprises the coffee extract and milk dissolved therein. This beverage squirts into the buffer reservoir 34, which will then start filling with the beverage. When starting the hot water unit, it therefore holds that the level of the liquid in the holder will start rising so that the inflow opening gets below the liquid surface, if this should not yet be the case at all in connection with the concentrated milk already present. As a result, the pressure in the additive holder will start rising so that the liquid is pressed from the holder via the siphon to the nozzle and the jet of the beverage (possibly initially a bit of milk concentrate and then the mixture of milk and coffee extract) is generated. Because the jet of the beverage impacts on the beverage already collected in the buffer reservoir, air is beaten into the beverage, and a beverage with a fine-bubble froth layer, in this case cappuccino, is thus formed. Because the outflow opening 60 is relatively small, the level of the beverage in the buffer reservoir will start rising. In other words, the liquid flow rate from the nozzle is greater than the liquid flow rate through the outflow opening 60 so that net more liquid is fed to the buffer reservoir than is discharged via the outflow opening 60. When the liquid level in the siphon rises further, the buffer reservoir will then start emptying by means of the overflow 64. Subsequently, the cappuccino flows through the beverage dispensing channel 66 and can then be collected in a holder, such as, for instance, a cup. After some time, the beverage unit 6 stops feeding hot water to the pad. As a result, the pressure in the beverage processing path 4 will fall out. Via the siphon, some liquid will still flow out of the additive holder. After this, the discharge of beverage from the additive holder via the siphon stops because the pressure in the additive holder will fall so that, eventually, a reduced pressure is generated and no liquid will flow through the siphon anymore. The buffer reservoir 34 empties via the outflow opening 60. After some time, all beverage will thus have flown away from the additive holder and the buffer reservoir and leave the apparatus via the beverage dispensing channel 66. After this, the beverage is ready for consumption.

When a beverage with a fine-bubble froth layer without an additive is to be prepared with the apparatus as described above, the additive holder is not filled with an additive, such as a milk powder or concentrated milk. For the rest, the operation is quite analogous to what has been described before. Hot water is thus pressed through the pad, after which coffee extract is formed, which is collected in the additive holder. The level of the liquid will start rising in the holder so that the inflow opening gets below the liquid surface. Quite analogously to what has been described before, the pressure in the additive holder will then start rising so that the liquid is pressed from the holder via the siphon to the nozzle. Via the nozzle, a jet of the beverage is thus generated, which is filled into the buffer reservoir 34. Quite analogously to what has been described before, air is beaten into the beverage. Thus is obtained a beverage with a fine-bubble froth layer, which leaves the apparatus via the overflow 64 and the outlet opening 60 via the beverage dispensing channel 66. The beverage is thus ready for consumption.

In both cases, after the beverage, cappuccino or normal coffee, has been prepared, the cover 10 can be lifted from the pad holder so that the used pad can be removed. Besides, the pad holder can be detached from the additive holder 30, as shown in FIG. 2b. The additive holder can then be cleaned. This also holds good for the pad holder. Besides, the additive holder can be uncoupled from the buffer reservoir, which can thus also be cleaned. Also, as clearly appears from FIGS. 2a and 2b, the siphon itself can be properly cleaned. In fact, both the outer channel 34 and the inner channel 50 are freely accessible.

The invention is by no means limited to the above-described embodiments. Thus, not only concentrated milk and coffee and milk powder, but also other additives may be used, such as, for instance, normal milk, coffee milk, sugar, strong drink etc. Also, the buffer reservoir 25 may be provided with two outflow openings 60, two overflows 64 and two beverage dispensing channels 66 for preparing two cups with the beverage fit for consumption, as described in PCT/NL01/00655. Besides, another type of beverage unit 2 may be used for preparing beverages of another type, instead of coffee. Here, for instance, tea, chocolate milk, lemonade etc may be considered. Such variants are each considered to fall within the scope of the invention.

The invention claimed is:

1. An apparatus for preparing a beverage fit for consumption with a fine-bubble froth layer, the apparatus comprising:
a beverage unit, which dispenses under pressure a beverage to be processed to a beverage processing path, the beverage processing path successively including a nozzle and a buffer reservoir, the nozzle being positioned relative to the buffer reservoir such that, in use, it generates a jet of the beverage, which squirts into the buffer reservoir to obtain the beverage with the fine-bubble froth layer, and the buffer reservoir being provided with an outlet path from the buffer reservoir for discharging the beverage with the fine-bubble froth layer from the buffer reservoir, wherein the beverage processing path, upstream of the nozzle, further includes an additive holder, which, in use, can be filled with a beverage additive, wherein the beverage leaving the beverage unit, in use, flows into the additive holder to dissolve the beverage additive in the beverage, wherein the additive holder is provided with an outlet path from the additive holder, via which the beverage is further transported from the additive holder to the nozzle to generate the jet of the beverage.

2. An apparatus according to claim 1, wherein the apparatus is further provided with a siphon for feeding the beverage from the additive holder to the nozzle when the level of the beverage in the additive holder exceeds a predetermined value.

3. An apparatus according to claim 2, wherein the siphon is provided with a part of the liquid flow path surrounded by channel walls, with an inflow opening located in the additive holder above a bottom of the additive holder and an outflow opening located outside the additive holder.

4. An apparatus according to claim 3, wherein the siphon is provided with a highest point, which is higher than the inflow opening.

5. An apparatus according to claim 4 wherein the outflow opening is located lower than a lowest part of the bottom.

6. An apparatus according to any claim 5, wherein the liquid flow path within the siphon is formed by an inner channel, which extends through the bottom of the additive holder, the inner channel being provided with a first open end located at a higher level than the inflow opening and a second open end located outside the additive holder and lower than the bottom of the additive holder, and an outer channel surrounding the inner channel, the outer channel extending to above the first open end and, above the first open end, being of closed design, and the outer channel being provided below the first open end with an opening forming the inflow opening of the liquid flow path.

7. An apparatus according to claim 6, wherein the outer channel is detachably connected with the inner channel.

8. An apparatus according to claim 7, wherein the beverage processing path, upstream of the additive holder, further includes a pad holder, which is arranged to include a pad, which comprises a product to be extracted or to be dissolved, such as ground coffee, through which pad in the holder, in use, a liquid flows, which is fed under pressure to the holder to obtain the beverage to be further processed, which is fed to the additive holder, at least part of the liquid flow path extending from the pad holder to the nozzle being of closed design so that pressure of the liquid fed to the pad holder is also present with the beverage fed to the nozzle to obtain the jet from the nozzle squirting into the buffer reservoir.

9. An apparatus according to claim 8, wherein the outer channel is connected with the pad holder.

10. An apparatus according to claim 9, wherein the pad holder and the additive holder are detachably connected with each other.

11. An apparatus according to claim 10, wherein the beverage unit is further provided with a hot water unit for feeding under pressure the liquid to the pad holder in the form of hot water.

12. An apparatus according to claim 11, wherein the additive holder is provided with an outflow opening for the beverage, the outflow opening of the additive holder being in fluid communication with the nozzle and/or forming the nozzle.

13. The apparatus of claim 1 wherein the second outflow path comprises a siphon configured to feed the beverage from the additive holder to the nozzle when the level of the additive holder exceeds a predetermined value.

14. The apparatus of claim 13 wherein the siphon is defined by an outer channel wall extending from the pad holder and an inner channel wall extending from the additive holder.

15. The apparatus of claim 14 wherein the beverage flows upward between the outer channel wall and the inner channel wall and downward within the inner channel wall to the nozzle.

16. The apparatus of claim 1 wherein the level of the additive holder that exceeds the predetermined value is defined by the height of the inner channel wall above a bottom surface of the pad holder.

* * * * *